United States Patent
Kimura et al.

(10) Patent No.: US 6,219,529 B1
(45) Date of Patent: Apr. 17, 2001

(54) WIRELESS COMMUNICATION SYSTEM USING ONLY THE MAGNETIC FIELD COMPONENT

(75) Inventors: Fumio Kimura; Tatsuo Miyoshi; Takashi Kamimoto; Yoshio Inokoshi; Seiji Kuwahara; Hitoshi Yoshida, all of Chiba (JP)

(73) Assignee: Seiko Instruments Inc. (JP)

( * ) Notice: Subject to any disclaimer, the term of this patent is extended or adjusted under 35 U.S.C. 154(b) by 787 days.

(21) Appl. No.: 08/503,817

(22) Filed: Jul. 18, 1995

(30) Foreign Application Priority Data

Jul. 19, 1994 (JP) .................................................. 6-167245

(51) Int. Cl.[7] .................................................. H04B 7/24
(52) U.S. Cl. .............................. 455/39; 455/107; 455/292
(58) Field of Search .................................. 455/39, 41, 106, 455/107, 292, 334, 40, 91, 351, 121, 123, 193.1; 375/256; 324/239; 341/15

(56) References Cited

U.S. PATENT DOCUMENTS

| 3,660,760 | * | 5/1972 | Schaad et al. | 455/41 |
| 3,787,772 | * | 1/1974 | Sedin | 455/91 |
| 3,898,565 | * | 8/1975 | Takeuchi et al. | 455/41 |
| 3,953,799 | * | 4/1976 | Albee | 455/334 |
| 4,071,714 | * | 1/1978 | Satoh | 455/41 |
| 4,363,137 | * | 12/1982 | Salisbury | 455/40 |
| 4,947,179 | * | 8/1990 | Ganter et al. | 455/351 |
| 5,040,239 | * | 8/1991 | Kondo et al. | 455/193.1 |
| 5,491,715 | * | 2/1996 | Flaxl | 455/107 |

FOREIGN PATENT DOCUMENTS

2202414 * 9/1988 (GB) .................................................. 455/41

OTHER PUBLICATIONS

Mohri et al. "Magneto-Impedance Element", IEEE Transactions on Magnetics, pp. 2455–2460, Jul. 1995.*

* cited by examiner

Primary Examiner—Reinhard J. Eisenzopf
Assistant Examiner—Lester G. Kincaid
(74) Attorney, Agent, or Firm—Adams & Wilks

(57) ABSTRACT

In order to eliminate the unnecessary power consumption caused by the increase in frequency associated with wireless communication systems using electromagnetic induction techniques, the wireless communication system of the present invention modulates and transmits a magnetic field in accordance with information. A close-range receiver is provided with an amorphous magnetic impedance element having an impedance which varies in accordance with the modulated characteristic of the magnetic field. Use of an amorphous magnetic impedance element in the receiver results in a reduction in power and increase in sensitivity of the device.

13 Claims, 6 Drawing Sheets

WIRELESS COMMUNICATION SYSTEM USING ONLY THE MAGNETIC FIELD COMPONENT

BACKGROUND OF THE INVENTION

1. Field of the Invention

The present invention relates to a technique for short-range data transfer between terminal devices used for compact and portable information terminal devices such as wireless handy terminals.

2. Description of the prior Art

Conventional short-range data transfer techniques for compact and portable information terminal devices utilize electromagnetic induction which occurs between electromagnetic coils in data transmission and reception portions. Such electromagnetic induction can be described as the relationship between an electrical field E and a magnetic field H given by the following equations (i.e. Maxwell's electromagnetic field equations).

$$rotE = -\mu dH/dt \quad (1)$$

$$rotH = -\epsilon dB/dt \quad (2)$$

In the above equations (1) and (2), A represents as a permeability; $\epsilon$ represents a dielectric constant; and t represents time.

FIG. 6 shows the scheme of the conventional short-range data transfer wherein electromagnetic coils are used in data transmission and reception portions. When an alternating current 26 including signal is applied to an electromagnetic coil 25 of a transmission portion 24, an a.c. magnetic field H is produced and an electrical field E is also induced according to Equation (1). In other words, when the alternating current 26 is applied to the electromagnetic coil 25 of the transmission portion 24, an electromagnetic wave 27 caused by interaction between the magnetic field H and induced electrical field E produced at the electromagnetic coil 25 of the transmission portion is radiated in a space. When the electromagnetic wave 27 radiated in the space is detected by an electromagnetic coil 29 of a reception portion 28, a current I 30 and a magnetic field are induced at the electromagnetic coil 29 of the reception portion 28 in accordance with Equations (1) and (2). The data at the transmitting end can be transferred to the receiving end by analyzing the induced current I 30. The conventional method of short-range data transfer techniques utilizing electromagnetic induction is summarized above. Such short-range data transfer techniques are widely used due to the simple circuitry employed, although the technique is less desirable in terms of transfer speed, transfer distance and the like than wireless communication techniques such as those used in portable telephones (mobile telephone systems) and radios.

Usually, it is required for a compact and portable wireless terminal to have the function of communication with the parent terminal and the function of communication with other offsprings. Such data transfer is carried out in a short-range such as several centimeters or in a state wherein the terminals are in contact with each other. In such situations, the electromagnetic induction system using electromagnetic coils as described above is required. Therefore, a compact and portable wireless terminal incorporates an analog circuit portion for transmission and reception of electrical waves in the range from several tens of MHz to several tens of GHz to be used for wireless communication (hereinafter referred to as RF circuit) and a relatively simple data transmission/reception circuit portion for performing short-range data transfer utilizing electromagnetic induction (hereinafter referred to as an electromagnetic induction circuit). As is apparent from Equations (1) and (2), a current I induced at the electromagnetic coil of the receiving end of the electromagnetic induction circuit is increased in proportion with the frequency of the signal to be transferred. Therefore, although the reception sensitivity is sufficient for transferred signals of high frequencies, the sensitivity is insufficient for low frequencies. This has resulted in a serious problem with data transfer systems using normal electromagnetic induction coils in that they can transfer only signals of high frequencies. Especially, transfer has been almost impossible for signals having frequencies of several tens of Hz or lower. This problem has necessitated designers to indiscriminately increase the frequency of signals to be transferred by short-range data transfer systems such as compact and portable wireless terminals in order to improve reception sensitivity. This has inevitably resulted in an increase in the power consumption of such an electromagnetic induction circuit which has created a serious problem in product design.

SUMMARY OF THE INVENTION

Essentially, the above-described problem is inevitable in systems utilizing electromagnetic induction. In order to solve this problem, according to the present invention, an amorphous magnetic impedance element is included in a data reception circuit. The amorphous magnetic impedance element (hereinafter referred to as and MI element) is an element in the form of a bulk or film of the type which has recently been attracting attentions as a high sensitivity magnetic sensor and whose impedance component changes greatly in response to application of a magnetic field thereto with an alternating current supplied. For example, see "FET Utilizing Amorphous MI Elements for 200 MHz Sensor Oscillator", Magnetics Research Institute Ref. No. MAG-93-99, published by DENKI GAKKAI (Institute of Electrical Engineers). As shown in FIG. 7, an electrical equivalent circuit for this MI element is constituted by an actual resistance component Rs and an inductance component Ls. When a magnetic field is applied, both or one of the Rs and Ls components of this element undergoes a significant change. Further, the MI element has the following major characteristics.

First, the impedance changes in response to the application of a magnetic field with high sensitivity which is exhibited for magnetism as low as 0.1 gauss or less.

Secondly, the magnetic fields which can be detected by this element include static magnetic fields and magnetic fields of high frequencies on the order of 10 MHz.

Thirdly, this element can be processed in extremely small dimensions such as a length of 1 mm or less and a diameter or thickness of $100\mu$ or less.

Fourthly, the electrical parameters to be changed (Rs and Ls) and the sensitivity can be freely selected depending on the conditions for the formation and packaging of the element.

In summary, the present invention is characterized in that a data reception circuit is configured using such an MI element instead of an electromagnetic coil.

The use of an MI element having the characteristics described above as an electromagnetic wave receiving element of a data reception circuit allows reception over a wide frequency band that covers static magnetic fields which do not oscillate over time and alternating current magnetic fields on the order of 10 MHz. As a result, the frequency for data transfer may be arbitrarily selected unlike reception circuits utilizing electromagnetic coils for which the frequency is limited to a high frequency band. This makes it possible to reduce the power consumption of a product to a value which is appropriate for the product.

Further, since the element itself is compact as described above, it is possible to make a product using the element compact. Another significant feature provided by the use of this MI element is that the configuration of the data transmitting end is not limited to an electromagnetic coil because the element directly detects changes in the magnitude and strength of a magnetic field. For example, it is possible to provide a purely mechanical transmission mechanism constituted by a simple magnet and a mechanical magnetic shielding mechanism which operates in conjunction with transmission data. The use of this MI element allows wireless data transfer (the so-called magnetic field communication) utilizing only changes in the magnitude and strength of a magnetic field.

DETAILED DESCRIPTION OF THE PREFERRED EMBODIMENTS

Figure 1:
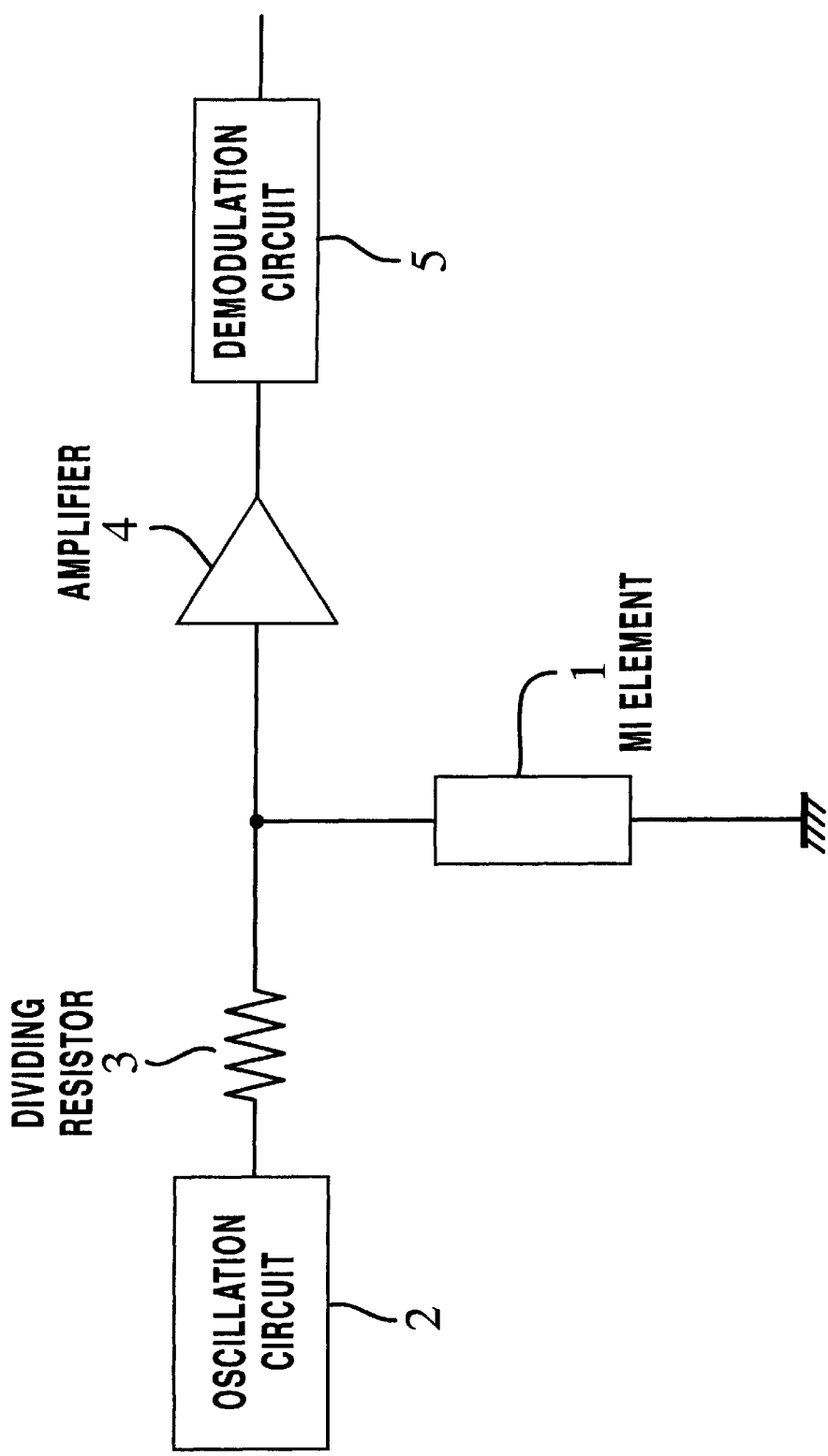
FIG. 1 is a block diagram of an embodiment of the present invention showing a configuration of a reception circuit that employs a data transfer system according to the present invention.

FIG. 1 shows a configuration of a data reception portion according to an embodiment of the present invention wherein an MI element of the invention is used for reception of an electromagnetic wave. In FIG. 1, a voltage having a frequency F generated by an oscillation circuit 2 is applied to a magnetic impedance element 1 (hereinafter referred to as MI element in both the drawings and description) according to the invention through a dividing resistor 3. When the MI element 1 detects a modulated magnetic field generated by the transmission portion, the impedance of the element changes. This change in impedance includes a change in the amplitude of the voltage across the MI element 1. In other words, the voltage across the element is subjected to AM modulation in accordance with the modulated magnetic field. The AM-modulated signal is amplified by an amplifier 4 and is demodulated by a demodulator 5 to obtain data. No special circuit configuration is required for the demodulation circuit 5 or amplifier 4 in this reception circuit. This is because the signal processed is equivalent to AM-modulated signals in the field of normal wireless communication. The function of the oscillation circuit 2 for driving the MI element is to simply apply an a.c. bias to the element. Therefore, the oscillation method of the oscillation circuit 2 and the oscillation frequency F are only matters of design choice which can be decided in view of the product specifications such as data transfer speed, the frequency of the reception magnetic field, and the power consumption of the product.

Figure 2:
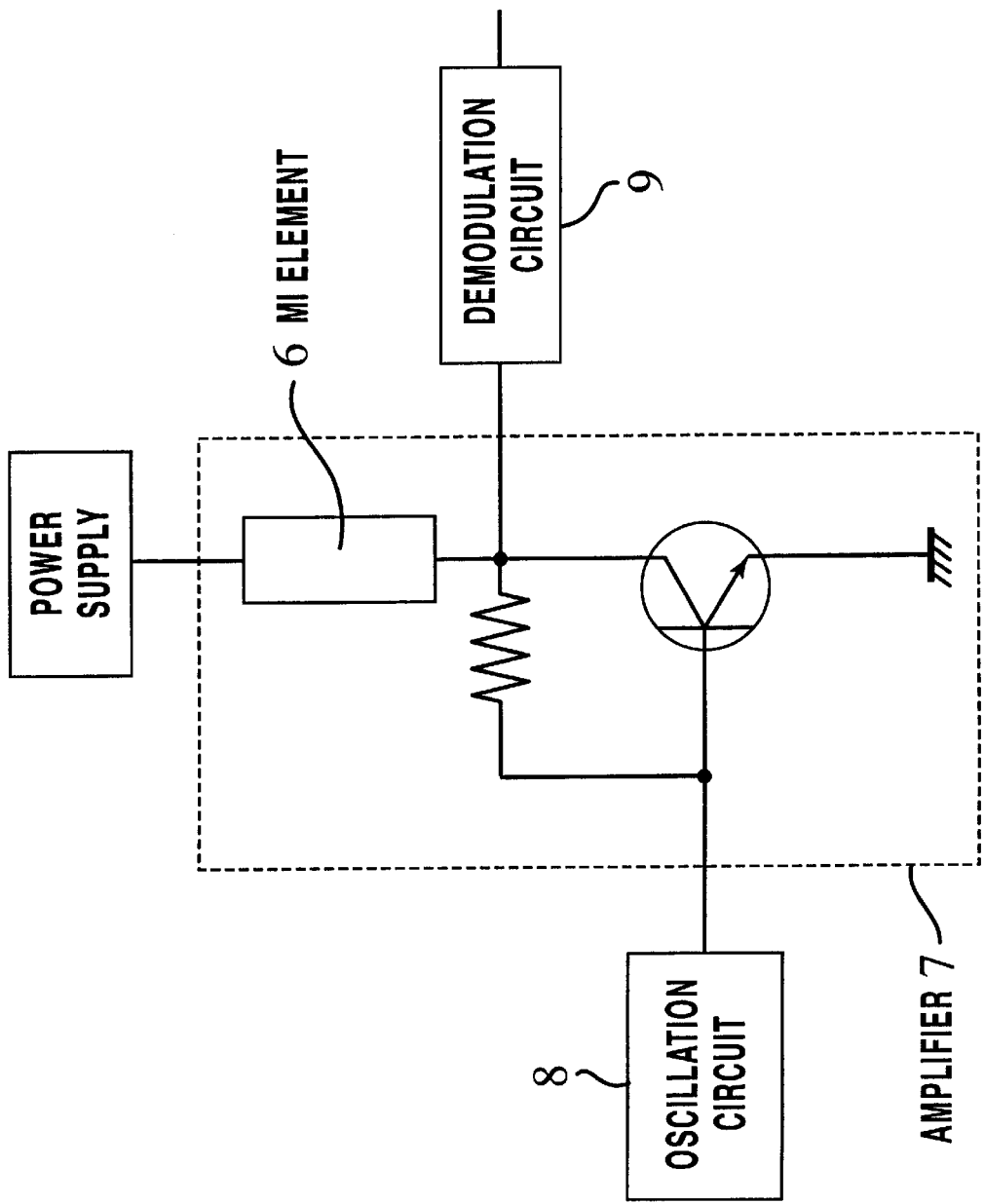
FIG. 2 is a block diagram of another embodiment of the present invention showing a configuration of a reception circuit that employs a data transfer system according to the present invention.

FIG. 2 shows a configuration of a data reception portion according to another embodiment of the present invention wherein an MI element of the invention is used for reception of an electromagnetic wave. In FIG. 2, a signal having a frequency F generated by an oscillation circuit 8 is amplified by an amplification circuit 7 constituted by a transistor. If an MI element 6 according to the present invention is used as a resistive element for determining the amplification factor of the amplification circuit 7 as shown in FIG. 2, the amplification factor changes when the MI element 6 detects a modulated magnetic field. That is, the signal output by the amplification circuit 7 is an AM-modulated signal as in the embodiment shown in FIG. 1. This AM-modulated signal is demodulated by a demodulation circuit 9. The reception method shown in FIG. 2 also necessitates no special configuration for the demodulation circuit 9, and the configuration of the oscillation circuit 8 is also only a matter of design choice for the same reason as given in the description of the first embodiment. The circuit configuration constituted by the amplifier circuit 7 and MI element 6 shown in FIG. 2 may be replaced by any other configuration of an amplification circuit only provided that the resistive element for determining the signal amplification factor can be replaced by an MI element. Therefore, the present invention is not limited to amplification circuits utilizing a transistor.

Figure 7:
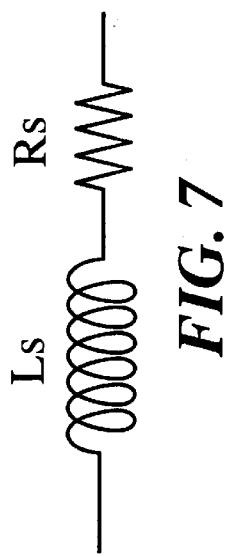
FIG. 7 is an electrical equivalent circuit diagram for an amorphous magnetic impedance element in the form of a bulk or film according to the present invention.

The MI elements 1 and 6 in the above-described embodiments shown in FIG. 1 and FIG. 2 are used in a manner wherein both or one of equivalent circuit constants Rs and Ls (see FIG. 7) thereof changes in response to a change in the magnetic field.

Figure 3:
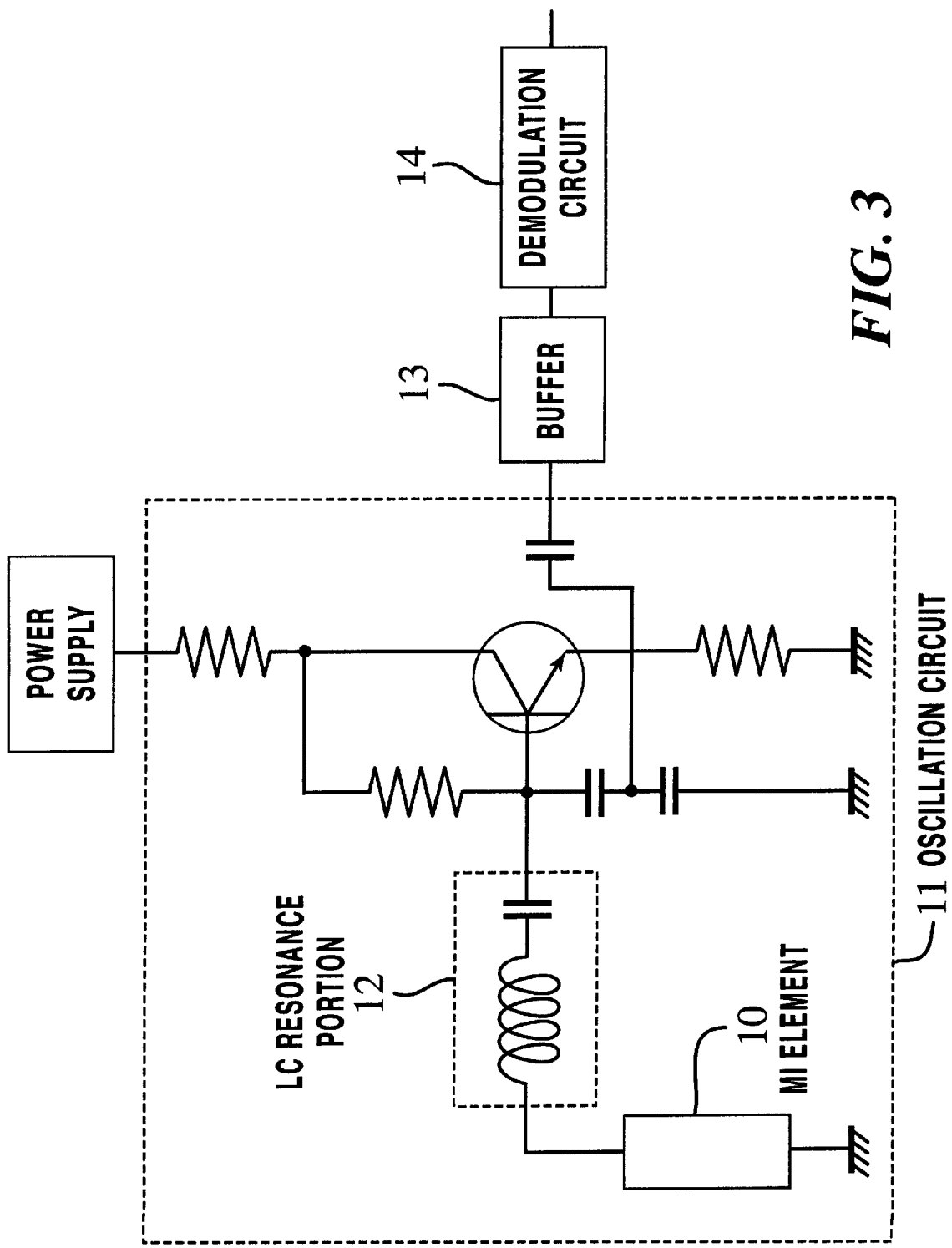
FIG. 3 is a block diagram of still another embodiment of the present invention showing a configuration of a reception circuit that employs a data transfer system according to the present invention.

FIG. 3 shows a configuration of a data reception portion according to still another embodiment of the present invention wherein an MI element of the invention is used for reception of an electromagnetic wave.

In FIG. 3, an MI element 10 is series-connected to an LC resonance portion 12 of an oscillation circuit 11. When the MI element 10 detects a modulated magnetic field, the signal output by the oscillation circuit 11 is modulated in amplitude or frequency or both. As a result, the oscillation circuit 11 outputs an AM-modulated signal or an FM-modulated signal or an AM/FM-modulated signal. This modulated signal is demodulated by a demodulation circuit 14 through a buffer 13. If only an actual resistance component Rs of the MI element 10 in the reception circuit changes in response to a change in the magnetic field, the oscillation circuit 11 outputs an AM-modulated signal. If only an inductance component Ls of the MI element 10 in the reception circuit changes, the oscillation circuit 11 outputs an FM-modulated signal. Further, if both of the component Rs and Ls change, an AM/FM-modulated signal is obtained because both the frequency and amplitude change.

The configuration of the demodulation circuit 14 in this embodiment is determined by the type of the modulated signal (AM, FM, etc.) output by the oscillation circuit 11. The choice of the configuration of the oscillation circuit 11 and LC resonance portion 12 and the oscillation method to be used is simply a design matter as in the embodiments shown in FIG. 1 and FIG. 2. The configuration of the buffer circuit 13 is designed in accordance with the characteristics of the oscillation circuit 11. The configuration of the oscillation circuit 11 is not limited to the use of a transistor, and an oscillation circuit that employs a CMOS invertor instead of a transistor may be used.

The shape, composition, magnetic field impedance characteristics, and the like of the MI elements used in the embodiments shown in FIG. 1 through FIG. 3 may be freely selected in consideration to the type, specifications, and shape of the product in which they are used. For example, the MI element may be processed into the form of a thin wire having a length of 1 mm and a diameter of 30 $\mu$m or a thin film in order to provide a compact product.

Figure 4:
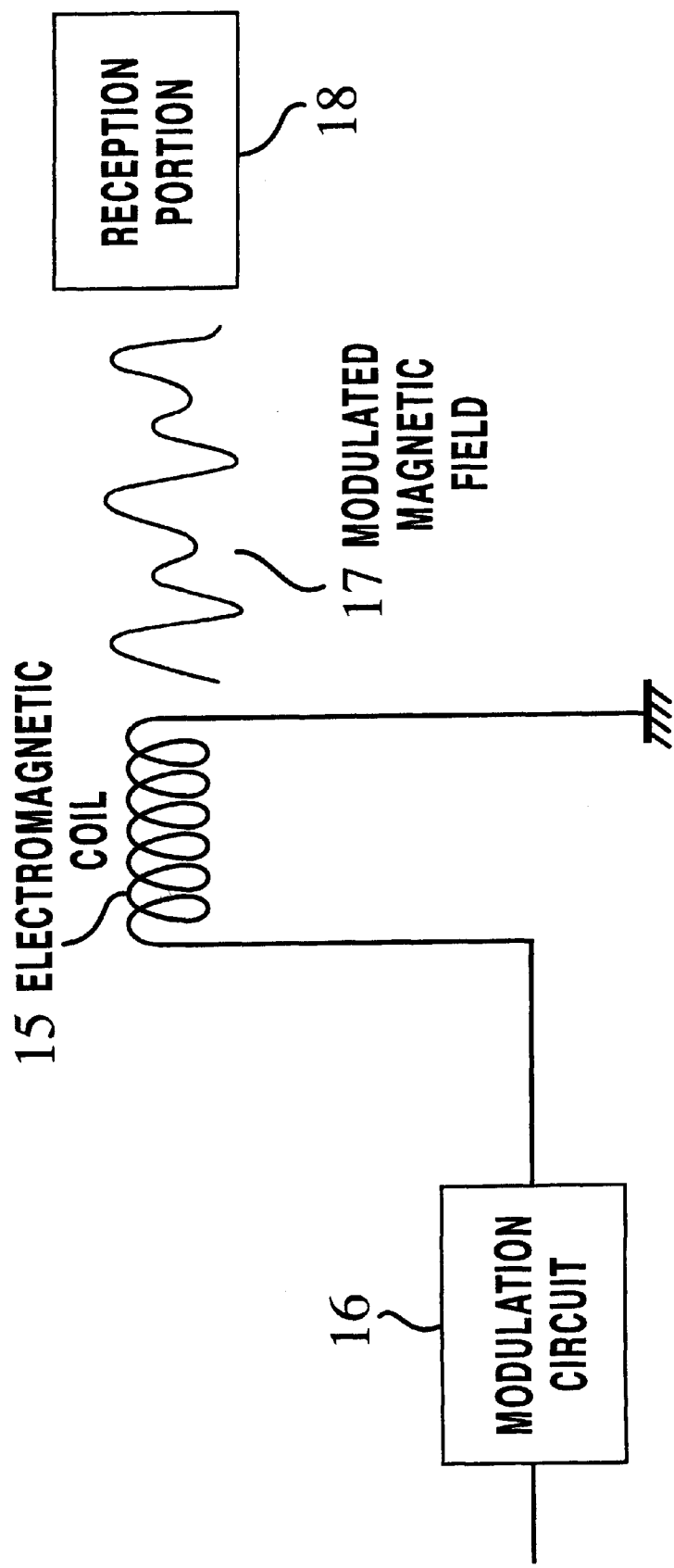
FIG. 4 is a block diagram showing an example of the configuration of a transmission circuit that employs a data transfer system according to the present invention.
Figure 6:
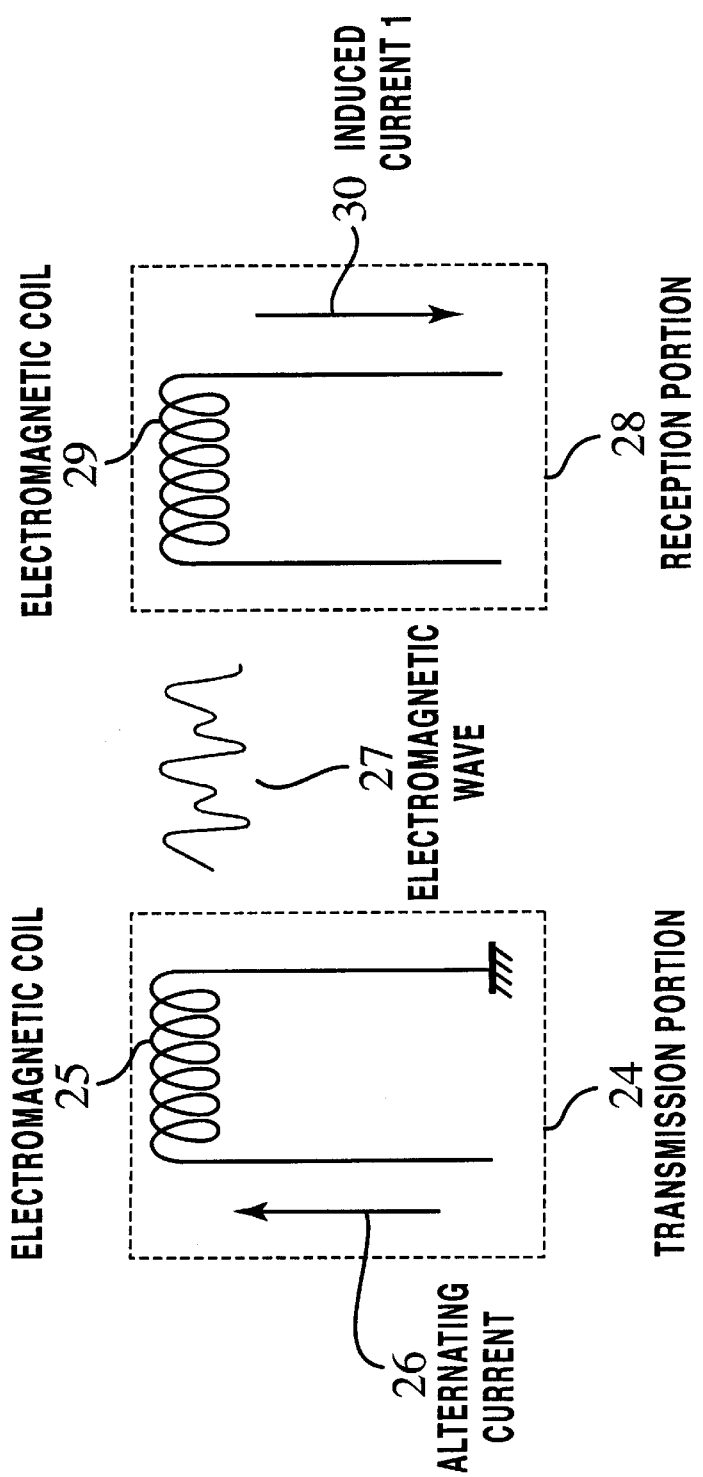
FIG. 6 illustrates the concept of conventional short-range data transfer utilizing electromagnetic induction.

FIG. 4 illustrates the concept of a data transmission portion related to the above-described embodiments of the invention. This transmission portion is constituted by a normal electromagnetic coil 15 and a modulation circuit 16. When an electrical signal which has been modulated by the modulation circuit 16 is input to the electromagnetic coil 15, an electromagnetic wave is generated which has been modulated in conjunction with the electrical signal. This mechanism is the same as the normal data transfer system utilizing electromagnetic induction as described above with reference to FIG. 6. This mechanism is greatly different from the conventional electromagnetic induction system in that only the magnetic field component, i.e. a modulated magnetic field 17, of the modulated electromagnetic field generated by the electromagnetic coil 15 is used as a carrier for data transfer. The modulated magnetic field 17 is input to the reception portion described above with reference to FIG. 1 through FIG. 3. It goes without saying that an iron core having high permeability may be inserted in the electromagnetic coil 15 in order to increase the strength of the modulated magnetic field. The data reception portion 18 is that of the above-described embodiments shown in FIG. 1 through FIG. 3.

Figure 5:
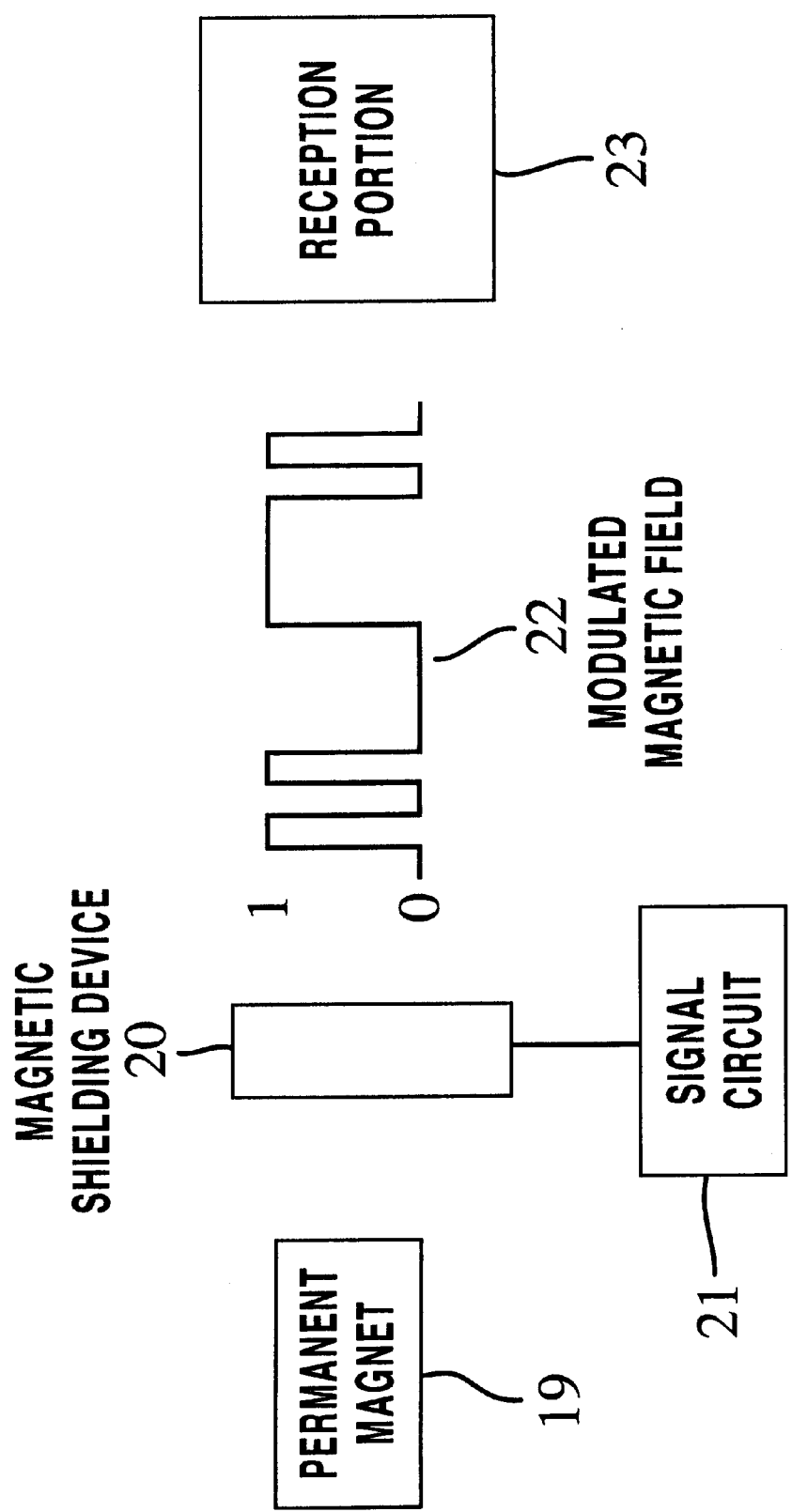
FIG. 5 is a block diagram showing another example of the configuration of a transmission circuit that employs a data transfer system according to the present invention.

FIG. 5 illustrates the concept of another data transmission portion related to the above-described embodiments of the invention. This transmission portion is constituted by a permanent magnet 19, a magnetic shielding device 20, and a signal circuit 21. The magnetic shielding device 20 is switched in conjunction with the signal circuit 21 and is turned on/off in accordance with the strength, pulse intervals, etc. of the signal from the signal circuit 21. As a result, for example, a modulated magnetic field 22 in the form of a pulse is generated. This modulated magnetic field 22 is input to any one of the reception portions 23 as described above with reference to FIG. 1 through FIG. 3 as in the case shown in FIG. 4.

The configurations of a transmission portion described above with reference to FIG. 4 and FIG. 5 are only illustrative, and it goes without saying that any mechanism may be employed as long as it electrically or mechanically generates a magnetic field which can be electrically or mechanically modulated. Further, no technical problem arises from any combination of such a transmission portion and any one of the reception portions described above with reference to FIG. 1 through FIG. 3.

The data transfer and reception systems according to the present invention with reference to the above embodiments take advantage of four major characteristics of an MI element as previously described. Therefore, they are very much advantageous compared to conventional systems utilizing electromagnetic induction in that signals to be transferred is not indiscriminately limited to a high frequency region; the frequencies of transferred signal can be selected to be appropriate for the product; and, as a result, the power consumption of the product can be significantly reduced. In addition, since an MI element is characterized in that it can be processed into a very small size, a reception circuit portion can be made compact, which in turn greatly contributes to the reduction of the size of the product in which it is used.

Further, the principle of reception at a system utilizing electromagnetic induction is based on interactions between electrical and magnetic fields which oscillate over time (i.e., an electromagnetic wave). As a result, such a system has been inevitably insufficient with regard to anti-electrical-noise measures at the receiving end because there has been a dilemma in that perfect anti-electrical-noise measures at the receiving end cut the electrical field of a signal. The present invention wherein a magnetic field is used as a carrier provides a significant merit in that sufficient anti-electrical noise measures can be taken. This is very much advantageous from the viewpoint of product quality.

Having thus described presently preferred embodiments of the present invention, it will now be appreciated that the aspects of the invention have been fully achieved, and it will be understood by those skilled in the art that many changes in construction and circuitry and widely differing embodiments and applications of the invention will suggest themselves without departing from the spirit and scope of the invention. The disclosures and the description herein are intended to be illustrative and are not in any sense limiting of the invention, more preferably defined in scope by the following claims.

What is claimed is:

1. A wireless communication system for communicating using only a magnetic field component, comprising: a transmission portion having a magnetic field generating system and a magnetic field modulating mechanism for converting data into a magnetic field which changes in strength in accordance with the data; and a reception portion having a magnetic impedance element for detecting the modulated magnetic field generated by the transmission portion, the magnetic impedance element having an impedance which changes in accordance with the detected modulated magnetic field.

2. A wireless communication system according to claim 1; wherein the transmission portion includes means for modulating at least one of the amplitude and the frequency of the magnetic field in accordance with the data, and the magnetic impedance element of the reception portion has an impedance that changes in accordance with variations in the at least one of the amplitude and frequency of the modulated magnetic field.

3. A wireless communication system according to claim 1; wherein the magnetic field generating system in the transmission portion includes one of an electromagnet coil and a magnet.

4. A wireless communication system according to claim 1; wherein the reception portion comprises an amorphous magnetic impedance element in bulk or film form.

5. A wireless communication system according to claim 1; wherein the reception portion comprises an oscillation circuit for driving the magnetic impedance element and a demodulation circuit for demodulating the data.

6. A wireless communications system comprising: a transmitter for converting information into a modulated magnetic field; and a receiver having a magnetic impedance element for receiving the modulated magnetic field, the magnetic impedance element having a variable impedance which is varied in accordance with a modulated characteristic of the modulated magnetic field.

7. A wireless communications system according to claim 6; wherein the transmitter includes means for modulating the amplitude of the magnetic field in accordance with the information.

8. A wireless communications system according to claim 6; wherein the transmitter includes means for modulating the frequency of the magnetic field in accordance with the information.

9. A wireless communications system according to claim 6; wherein the transmitter includes means for modulating the amplitude and the frequency of the magnetic field in accordance with the information.

10. A wireless communications system according to claim 6; wherein the magnetic impedance element has an inductive component and a resistive component.

11. A wireless communications system according to claim 6; wherein the magnetic impedance element comprises an amorphous magnetic impedance element.

12. A wireless communications system according to claim 6; wherein the transmitter includes one of an electromagnetic coil and a magnet.

13. A wireless communications system according to claim 6; wherein the receiver further comprises an oscillator for driving the magnetic impedance element and a demodulator for demodulating a signal output by the magnetic impedance element.

* * * * *